United States Patent
Cremer

(10) Patent No.: US 7,076,173 B2
(45) Date of Patent: Jul. 11, 2006

(54) METHOD FOR DISPERSION COMPENSATION REGULATION

(75) Inventor: Cornelius Cremer, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 687 days.

(21) Appl. No.: 10/211,421

(22) Filed: Aug. 2, 2002

(65) Prior Publication Data

US 2003/0025970 A1 Feb. 6, 2003

(30) Foreign Application Priority Data

Aug. 2, 2001 (DE) .............................. 101 37 868

(51) Int. Cl.
*H04B 10/12* (2006.01)
(52) U.S. Cl. ...................... 398/147; 398/192
(58) Field of Classification Search ............... 398/141, 398/147, 91, 98, 192
See application file for complete search history.

(56) References Cited

U.S. PATENT DOCUMENTS 6,889,347 B1 * 5/2005 Adams et al. .............. 714/704
2002/0089724 A1 * 7/2002 Nishimoto et al. ......... 359/161

* cited by examiner

*Primary Examiner*—David C. Payne
(74) *Attorney, Agent, or Firm*—Bell, Boyd & Lloyd LLC

(57) ABSTRACT

A method for dispersion compensation regulation wherein, in order to transmit high-bit-rate optical signals, in a first step a bit-rate-reduced optical signal is formed from the high-bit-rate optical signal by the N-fold repetition at the transmitting end of each logic 1 and each logic 0, and in a second step the bit-rate-reduced optical signal is transmitted. In a third step the bit error rate of the transmitted bit-rate-reduced optical signal is determined at the receiving end, and in a fourth step the absolute-magnitude compensations of the dispersion compensation units are regulated in such a way that the determined bit error rate is minimized. After the bit error rate has been minimized by regulations the second to fourth steps are repeatedly carried out for the high-bit-rate optical signal.

4 Claims, 1 Drawing Sheet

OTS

METHOD FOR DISPERSION COMPENSATION REGULATION

BACKGROUND OF THE INVENTION

The present invention relates to a method for dispersion compensation regulation in an optical transmission system, having dispersion compensation units, for transmitting high-bit-rate optical signals.

In the case of existing optical transmission systems, particularly optical wavelength division multiplexing (WDM) transmission systems, optical signals or WDM signals are transmitted at high bit rates (40 Gbit/s and more) via optical fiber link sections. During the transmission of optical signals, fiber dispersion caused by the different group delay times of the optical transmission fibers occurs, in particular, in addition to further nonlinear effects. The error-free transmission of optical signals via such an optical transmission system requires that this optical fiber dispersion be compensated with substantial accuracy. In this case, the tolerance range of an error compensation is directly proportional to the inverse square of the bit rate of the optical signal to be transmitted; that is to say, the higher the bit rate of the optical signal the more accurately the dispersion compensation must be.

This results in a very narrow tolerance range for the dispersion compensation regulation for the transmission of high-bit-rate optical signals with bit rates bigger than 50 Gbit/s. Such an accurate regulation of the dispersion compensation is associated with a high technical outlay, since the fiber dispersion of already laid optical fiber links or optical transmission fibers can be estimated only with low accuracy. For this purpose, for example, an optical test signal, which can be a random signal, is fed at the transmitting end into the optical transmission system and the bit error rate of the transmitted optical test signal is determined at the receiving end. Dispersion compensation is regulated by the minimization of the determined bit error rate of the transmitted optical signal.

Methods are known for this purpose in which the absolute-magnitude compensations of the dispersion compensation units are set in accordance with an estimated fiber dispersion, and the bit error rate (BER) of the transmitted optical WDM signal is subsequently determined. Known for the purpose of determining the bit error rate are a number of different methods that are used with commercially available measuring instruments to determine the bit error rate; for example, from Agilent. By varying the absolute-magnitude compensations of the dispersion compensation units, regulation is performed to a minimum bit error rate, and the optimum setting of the dispersion compensation units is thereby determined. However, the estimation of the absolute-magnitude compensations proves to be disadvantageous in the communication of high-bit-rate optical signals, since most estimated absolute-magnitude compensations lead to a bit error rate (BER) far removed from the minimum. In this case, it is virtually impossible to determine the bit error rate, since the forward error correction (FEC) of the optical receiving unit is no longer capable of correcting such high bit errors. Finding a suitable estimated value for the absolute-magnitude compensations is, therefore, extremely time-consuming and cost-intensive and does not always lead to an optimum dispersion compensation of the optical transmission links to be set up.

An object to which the present invention is directed lies in improving the dispersion compensation regulation carried out with the aid of a bit error rate minimization within an optical transmission system.

SUMMARY OF THE INVENTION

A key aspect of the method according to the present invention for dispersion compensation regulation is that in an optical transmission system, having dispersion compensation units, for transmitting high-bit-rate optical signals, in a first step a bit-rate-reduced optical signal is formed from the high-bit-rate optical signal by the N-fold repetition at the transmitting end of each logic 1 and each logic 0. In a second step, the bit-rate-reduced optical signal is transmitted, and in a third step the bit error rate of the transmitted bit-rate-reduced optical signal is determined at the receiving end. In a fourth step, the absolute-magnitude compensations of the dispersion compensation units are regulated in such a way that the determined bit error rate is minimized and, after the bit error rate has been minimized, the second to fourth steps are repeatedly carried out for the high-bit-rate optical signal. The inventive reduction of the transmission bit rate of the transmitting unit advantageously facilitates the setting up of the optical transmission link or the optical transmission system by virtue of the fact that even for a non-optimum estimation of the absolute-magnitude compensations of the dispersion compensation units it is possible in the optical receiving unit to recover the transmitted bit-rate-reduced optical signal without high technical outlay, and to determine the bit error rate of the transmitted optical signal, which is utilized as regulating criterion. Consequently, in the case of the first iteration of the method according to the present invention, the dispersion compensation regulation is firstly carried out for a low bit rate; for example, 10 Gbit/s. The transmission link precompensated in such a way is regulated in the next step for the actual transmission bit rate of the high-bit-rate optical signal such that the absolute-magnitude compensations required for an error-free bit error rate measurement are already set for dispersion compensation. The method according to the present invention can be indicated in a technically simple fashion as a control routine for driving the optical transmitter in already existing optical transmission systems, the setting up of an optical transmission system thereby being substantially simplified.

A further advantage of the method according to the present invention resides in that the first to fourth steps of the dispersion compensation regulation are carried out repeatedly, the number N of repetitions being reduced in a step-wise fashion.

Additional features and advantages of the present invention are described in, and will be apparent from, the following Detailed Description of the Invention and the Figures.

DETAILED DESCRIPTION OF THE INVENTION

Figure 1:
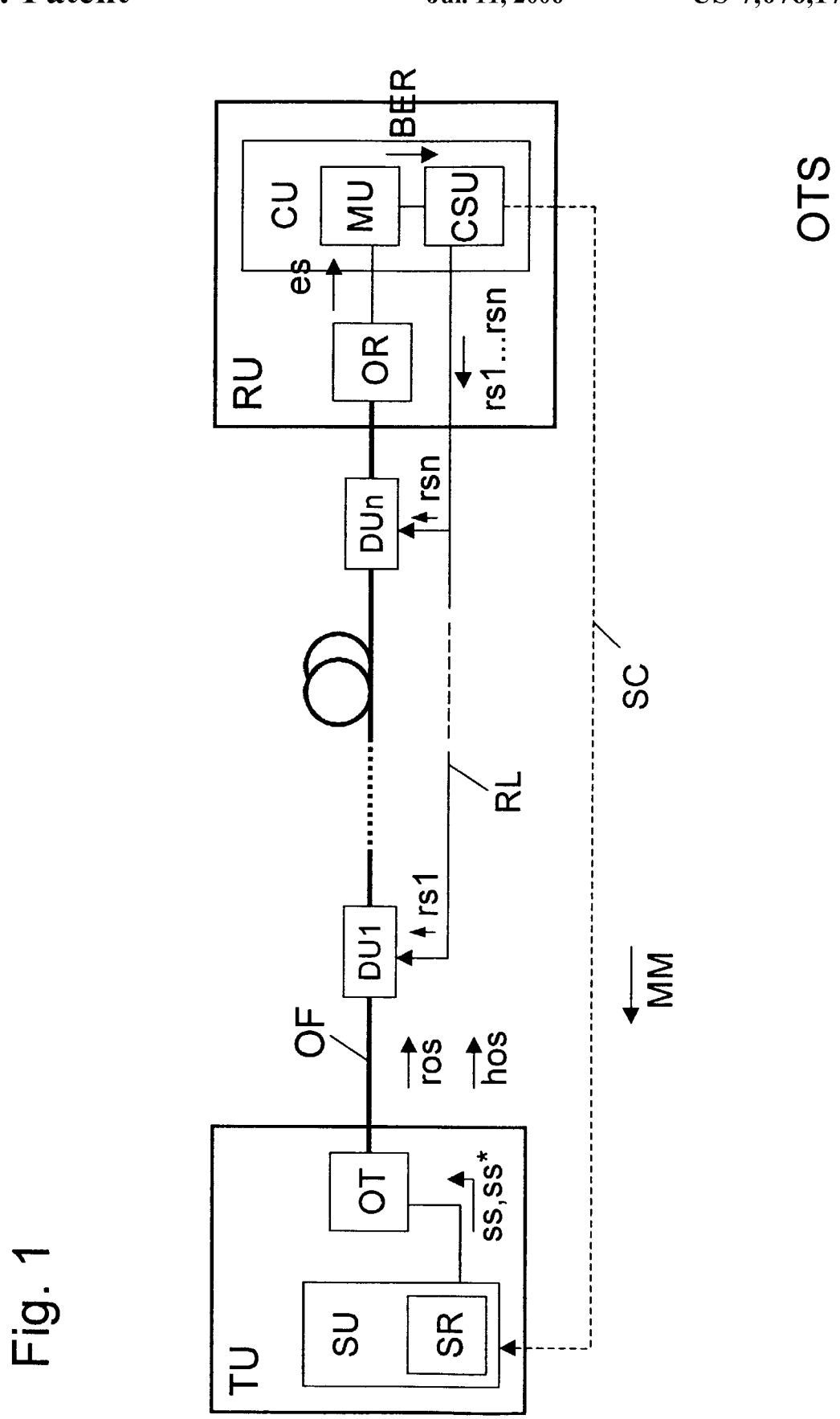
FIG. 1 shows an optical transmission system to which the method for dispersion compensation regulation of the present invention is associated.

Illustrated by an example in FIG. 1 is an optical transmission system OTS that has an optical transmitting unit TU, an optical receiving unit RU, an optical transmission fiber OF, and first to nth optical controllable dispersion compensation units DU1 to DUn. The optical transmitting unit TU is connected to the optical receiving unit RU via the optical transmission fiber OF and the first to nth optical controllable dispersion compensation units DU1 to DUn.

Furthermore, the optical transmission unit TU has, for example, a control unit SU and an optical transmitter OT that is connected to the optical transmission fiber OF. A control routine SR via which the optical transmitter OT is controlled with the aid of control commands ss, ss* is executed in the control unit SU.

The optical receiving unit RU has an optical receiver OR and a regulating unit CU with a measuring unit MU and a control signal generating unit CSU. The input of the optical receiver OR is connected to the optical transmission fiber OF, and the output of the optical receiver OR is led to the regulating unit CU and/or to the measuring unit MU.

The measuring unit MU located in the regulating unit CU is connected to the input of the control signal generating the unit CSU, to whose output there are connected a control line RL and a monitoring channel or a supervisory channel SC. The control line RL connects the controllable first to nth dispersion compensation units DU1 to DUn to the control signal generating unit CSU for the purpose of transmitting the first to nth, and the monitoring channel SC is connected to the control unit SU of the optical receiving unit TU.

Transmitting high-bit-rate optical signals hos, such as with bit rates greater than 40 Gbit/s, from the optical transmitting unit TU via the optical transmission fiber OF as well as via the dispersion compensation units DU1 to DUn to the optical receiving unit RU requires optimum compensation of the fiber dispersion occurring during the transmission of the high-bit-rate optical signals hos so that the high-bit-rate optical signal hos can be recovered at the receiving end. For this purpose, the optical transmission system OTS is initially operated in a "synchronization mode" in which the optical transmission system is still optimized with regard to its system properties. For this purpose, the high-bit-rate optical signal hos formed in the transmitting unit TU is firstly repeated N-fold in a bitwise fashion with the aid of the optical transmitter OT controlled via the control routine SR. That is to say, in a first step the optical transmitter OT repeats each logic 1 and each logic 0 of the high-bit-rate optical signal hos, and a bit-rate-reduced optical signal ros is thus formed that is subsequently transmitted via the optical transmission system OTS. In this case, the control routine SR determines the maximum number N of repetitions by virtue of the fact that the transmission bit rate of the high-bit-rate optical signals hos is divided, for example, by an initial bit rate of 10 Gbit/s, and the maximum number N of the repetitions is given by the integral portion of the division result. The initial bit rate can be selected as desired for the respective optical transmission system and can be adapted individually to the system properties of the optical transmission system.

With the aid of the determined maximum number N of repetitions, the control unit SU generates the control commands ss via which the optical transmitter OT is driven. As described above in detail, the optical transmitter OT subsequently forms a bit-rate-reduced optical signal ros whose transmission bit rate is reduced by the factor N by comparison with the transmission bit rate of the high-bit-rate optical signal hos. For example, a number N=4 of repetitions results for a transmission bit rate of the high-bit-rate optical signal hos of 40 Gbit/s. The transmission rate of the bit-rate-reduced optical signal ros then corresponds to a 10 Gbit/s.

In a second step, the bit-rate-reduced optical signal ros is transmitted via the optical transmission fiber OF and via the dispersion compensation units DU1 to DUn to the optical receiving unit RU and converted by the optical receiver into, for example, a bit-rate-reduced electric signal es. A part of, or the complete bit-rate-reduced electric signal es, is fed to the regulating unit CU, and in a third step the measuring unit MU determines the bit error rate BER of the bit-rate-reduced electric signal. Methods known from the prior art for bit rate measurement BER are used for this purpose.

The bit error rate BER is indicated to the control signal generating unit CSU, and in the latter a first to nth control signal rs1 to rsn are formed in a fourth step in order to regulate the absolute-magnitude compensations of the controllable first to nth dispersion compensation units DU1 to DUn. The regulating unit CU at the receiving end is used to correct the absolute-magnitude compensations of the controllable first to nth dispersion compensation units DU1 to DUn until the determined bit error rate BER exhibits a minimum.

After the bit error rate BER has been minimized by regulation for the current transmission rate of the bit-rate-reduced optical signal ros, a message MM reports, for example, via the supervisory channel SC of the optical transmission system OTS or a transmission channel, specifically provided for this purpose, of the optical transmitting unit TU or the optical control unit SU thereof that the setting of the absolute-magnitude compensations of the first to nth dispersion compensation units DU1 to DUn has been concluded for the current transmission bit rate; that is to say, the reduced transmission bit rate. The control command ss is modified by the control routine SR after receipt of this information or this message MM by the control unit SU arranged at the transmitting end. The modified control command ss* is communicated to the optical transmitter OT, and the former does not cause the optical transmitter OT to send any repetitions of the logic 0 or logic 1 of the high-bit-rate optical signal, but causes it to emit the high-bit-rate optical signal hos at its actual transmission bit rate. Subsequently, the high-bit-rate optical signal hos is transmitted to the optical receiving unit RU in accordance with the second step via the optical transmission fiber OF and the first to nth dispersion compensation units DU1 to DUn.

In the optical receiving unit RU, the transmitted high-bit-rate optical signal hos is converted by the optical receiver OR into a high-bit-rate electric signal es that is relayed to the measuring unit MU of the regulating unit RU. In the third step, the bit error rate BER of the high-bit-rate electric signal es is then determined in the measuring unit MU, and the bit error rate BER is indicated to the control signal generating unit CSU. By analogy with the fourth step, in the control signal generating unit CSU first to nth control signals rs1 to rsn are formed in order to regulate the absolute-magnitude compensations of the first to nth dispersion compensation units DU1 to DUn, which are communicated, in turn, thereto via the regulating line RL.

In this way, the absolute-magnitude compensations of the first to nth dispersion compensation units DU1 to DUn are connected until a minimum of the bit error rate BER is also reached for the transmission of the high-bit-rate optical signals hos. The reaching of the minimum can be reported, for example, to the optical transmitting unit TU, again via a message MM via the supervisory channel SC or an additional transmission channel. After receipt of the message MM, the control routine SR running in the control unit SU switches the optical transmission system OTS over from the "synchronization mode" into the "operating mode".

In the case of very high transmission bit rates (greater than 40 Gbit/s) the four steps of the method according to the present invention are carried out repeatedly, the number N of the repetitions being reduced in a stepwise fashion before each renewed iteration by the control routine SR. As a result, a number of bit-rate-reduced optical signals ros are formed from the high-bit-rate optical signal hos with a transmission bit rate rising from iteration step to iteration step. Consequently, the dispersion compensation regulation for reducing the fiber dispersion of the optical transmission link is refined in a stepwise fashion. Owing to this refinement of the regulation being carried out in a stepwise fashion with the aid of the control routine SR, it is also possible without any problem or high technical outlay to set up an optical transmission link for high-bit-rate optical signals with a transmission rate of greater than 160 Gbit/s.

Instead of a conventional data transmission signal as high-bit-rate optical signal hos, it is also possible to use a random sequence of logic 1 and logic 0 in the "synchronization mode".

Indeed, although the present invention has been described with reference to specific embodiments, those of skill in the art will recognize that changes may be made thereto without departing from the spirit and scope of the present invention as set forth in the hereafter appended claims.

The invention claimed is:

1. A method for dispersion compensation regulation in an optical transmission system, having dispersion compensation units, for transmitting high-bit-rate optical signals, the method comprising the steps of:

forming, in a first step, a bit-rate-reduced optical signal from at least one of said high-bit-rate optical signals by an N-fold repetition at a transmitting end of each logic 1 and each logic 0 of said high-bit-rate optical signal;

transmitting, in a second step, the bit-rate-reduced optical signal;

determining, in a third step, a bit error rate of the transmitted bit-rate-reduced optical signal at a receiving end;

regulating, in a fourth step, absolute-magnitude compensations of the dispersion compensation units such that the determined bit error rate is minimized; and repeating the second to fourth steps for the high-bit-rate optical signal.

2. A method for dispersion compensation regulation in an optical transmission system as claimed in claim 1, wherein the first to fourth steps of the dispersion compensation regulation are carried out repeatedly, with the number N of repetitions being reduced in a stepwise fashion.

3. A method for dispersion compensation regulation in an optical transmission system as claimed in claim 1, wherein a maximum integral value for the number N of repetitions is determined by dividing the bit rate of the high-bit-rate optical signal by 10 Gbit/s.

4. A method for dispersion compensation regulation in an optical transmission system as claimed in claim 1, wherein the high-bit-rate optical signal is formed from a random sequence.

* * * * *